United States Patent
Shimazawa et al.

(10) Patent No.: US 6,235,394 B1
(45) Date of Patent: May 22, 2001

(54) HEAT-EXPANDABLE MICROCAPSULES, PROCESS FOR PRODUCING THE SAME, AND METHOD OF UTILIZING THE SAME

(75) Inventors: Toshiyuki Shimazawa; Ichiro Takahara, both of Osaka (JP)

(73) Assignee: Matsumoto Yushi-Seiyaku Co., Ltd., Yao (JP)

(*) Notice: Subject to any disclaimer, the term of this patent is extended or adjusted under 35 U.S.C. 154(b) by 0 days.

(21) Appl. No.: 09/622,835

(22) PCT Filed: Feb. 23, 1999

(86) PCT No.: PCT/JP99/00809

§ 371 Date: Aug. 24, 2000

§ 102(e) Date: Aug. 24, 2000

(87) PCT Pub. No.: WO99/43758

PCT Pub. Date: Sep. 2, 1999

(30) Foreign Application Priority Data

Feb. 24, 1998 (JP) .................................................. 10-058932

(51) Int. Cl.[7] ...................................................... B32B 15/02
(52) U.S. Cl. ................. 428/402.21; 428/402; 428/402.2; 428/402.22; 524/457; 524/849; 524/879; 106/14.35; 106/14.36; 106/14.42
(58) Field of Search ................................ 428/402, 402.2, 428/402.21, 402.22; 524/457, 849, 879; 106/14.35, 14.36, 14.42

(56) References Cited

U.S. PATENT DOCUMENTS

| | | | |
|---|---|---|---|
| 3,615,972 | 10/1971 | Morehouse, Jr. et al. | 156/79 |
| 4,287,308 | 9/1981 | Nakayama et al. | 521/53 |
| 4,888,241 | 12/1989 | Melber et al. | 428/407 |
| 5,521,253 | 5/1996 | Lee et al. | 525/301 |
| 5,536,756 | 7/1996 | Kida et al. | 521/56 |

FOREIGN PATENT DOCUMENTS

| | | |
|---|---|---|
| 42-26524 | 12/1942 | (JP) . |
| 56-113338 | 9/1981 | (JP) . |
| 62-286534 | 12/1987 | (JP) . |
| 2-303573 | 12/1990 | (JP) . |
| 5-285376 | 11/1993 | (JP) . |
| 6-240040 | 8/1994 | (JP) . |
| 7-96167 | 4/1995 | (JP) . |
| 8-500621 | 1/1996 | (JP) . |

*Primary Examiner*—Samuel A. Acquah
(74) *Attorney, Agent, or Firm*—Foley & Lardner

(57) ABSTRACT

A heat-expandable microcapsule comprising a polymer shell formed by polymerizing (I) acrylonitrile, a main monomer component, (II) a monomer having carboxyl and (III) a monomer having groups reactive with the carboxyl of the monomer (II) and of a liquid having a boiling point lower than the softening point of the polymer and being encapsulated in the polymer shell. The heat-expandable microcapsules expand within high temperature range, 240° C. or above, and have heat-resistance.

14 Claims, No Drawings

HEAT-EXPANDABLE MICROCAPSULES, PROCESS FOR PRODUCING THE SAME, AND METHOD OF UTILIZING THE SAME

TECHNICAL FIELD

The present invention relates to heat-expandable microcapsules having superior heat-resistance, the process producing the same and the application thereof.

TECHNICAL BACKGROUND

Heat-expandable microcapsules comprising thermoplastic polymer shell in which low-boiling-point solvent is encapsulated have been under investigation for a long time. For example, the technique disclosed in Japanese Patent Publication Sho-42-26524 relates to a general production process of heat-expandable microcapsules. The technique disclosed in Japanese Patent Laid Open Sho-62-286534 and Japanese Patent Laid Open Hei-5-285376 (U.S. Pat. No. 5,536,756) provides the processes for producing heat-resistant heat-expandable microcapsules wherein the shell of heat-expandable microcapsules is formed by polymerizing the monomers containing 80% or more of acrylonitrile or the monomers which form homopolymers of high glass-transition point for the purpose of increasing the starting temperature of microcapsules' expansion and by adding a small amount of radically polymerizing polyfunctional monomers to the above monomers for the purpose of improving the heat-resistance of resultant microcapsules with the polyfunctional monomers which thermally polymerize and harden the shell of the microcapsules at their expansion. Those processes do not work well as expected if the polymers are not cross-linked spontaneously and densely when the microcapsules are heated.

Recently the character of synthetic polymers has been greatly changed since engineering plastics were developed and Kaminsky's catalyst was invented. In addition, the needs for recycling and reuse of polymers have emerged with the change of the social concept toward environmental problems. And crystalline polymers such as polyethylene, polypropylene and PET are used frequently instead of cross-linking polymers such as polyurethane.

Under such situation, new expanding agents, which expand at higher temperature than conventional ones, are required. In addition, they are required to have heat-resistance durable enough during long-time use at high temperature. Organic expanding agents meet those requirements but they are apt to form a continuous cell, which has poor property such as low tenacity of polymer. The inventors have produced microcapsules that are durable under high-temperature molding and expand to produce single closed cells when required.

The microcapsules can also be applied to various fields as a filler of low density and high heat resistance when the microcapsules are expanded and processed into composite with inorganic components for controlling their specific gravity.

The expanding temperature of conventional expandable microcapsules having polymer shell of which main component is acryl ester depends on the Tg and molecular weight of the polymer and on the boiling point of encapsulated liquid. For increasing the starting temperature of microcapsules' expansion, a liquid of higher molecular weight needs to be encapsulated and thus the quantity of the encapsulated liquid must be increased to keep the internal pressure of vaporized liquid, which decreases with the increase of molecular weight of an encapsulated liquid, at a proper level. In this case, the shell of microcapsules becomes thinner due to the decrease of the ratio of polymer that forms the shell of microcapsules. At the initial step of expansion, such thin shell cannot retain encapsulated liquid (gas of vaporized encapsulated liquid) in microcapsules against the high pressure of the vaporized liquid and the gas is exhausted drastically to decrease the expansion ratio. In addition, the maximum expansion ratio is apt to be lowered.

Drastically softened polymer shell cannot retain gas in microcapsules and results in the leakage of gas through shell. Polymer shell of higher softening point (or higher Tg) is desirable for microcapsules durable at high temperature.

Many of the acryl ester polymers having high Tg have bulky structure. And the polymers of which molecular chains are not thermally kinetic due to steric hindrance have high Tg. Thus their molecules have wide interspace and do not soften easily owing to their bulky structure.

Such property is preferable to the softening of polymer shell that results in the dissolution and release of the molecules of encapsulated liquid, but it is disadvantageous for producing heat-resistant microcapsules (which retain the gas of encapsulated liquid within polymer shell).

DISCLOSURE OF INVENTION

Considering the result, we have screened out monomers satisfying the following two requirements.

(1) Making homopolymer of high Tg
(2) Comparatively small molecules, which are apt to crystallize Only a few monomers meet the requirements and crystalline monomers are highly soluble in water. Thus some modification is necessary for producing microcapsules from the monomers as main components satisfying the above requirements because they cannot be processed into microcapsules in the ordinary reaction procedure.

The inventors paid their attention to the high Tg, heat-resistance, high hydrogen-bonding tendency and superior gas-diffusion preventability of polycarboxylic acid monomers, and investigated on the parameters for producing microcapsules from such monomers. Polycarboxylic acids are stable and insoluble in water in acidic form. Thus their derivatives were found to function well as the shell of microcapsules so far as they are kept in acidic or neutral. In addition, their molecules easily associate owing to their high hydrogen-bonding tendency, rarely diffuse encapsulated solvent and well retain the gas in microcapsules.

Acrylic acid monomers cannot be processed into microcapsules of satisfactory quality in an ordinary production process due to their high solubility in water. Because acrylic acid monomers cannot be retained in the oil phase of the dispersion system in an ordinary production process of microcapsules wherein monomers are dispersed in water and processed into polymer shell through in situ polymerization from oil phase For dissolving acrylic acid in oil phase, highly water-soluble substances, such as inorganic salts, are added in water phase to disperse acrylic acid into oil phase forcibly with salting-out effect. And thus acrylic acids gather nearer to the interface to form a shell having acrylic-acid-rich outer layer. And the degree of crystallization of the polymer shell reaches to a sufficient level owing to the association of carboxylic acid and the shell functions satisfactorily as heat-expandable microcapsules (foaming microcapsules).

With the monomers satisfying the above two requirements, heat-expandable microcapsules comprising a polymer of high Tg and short intermolecular distance and having stable expansion performance to keep encapsulated liquid stably at high-temperature foaming region, in other words, having so-called high-temperature foaming performance have been invented.

However, the microcapsules designed on the basis of such performance, of which main components are acrylonitrile and acrylic acid monomers, had insufficient performance for foaming stably within a wide temperature range, though they had improved expansion behavior at high temperature. Because the resin was thermoplastic and not durable against heat to soften drastically at high temperature, to fail to keep the capsule structure and to facilitate the diffusion of encapsulated gas through polymer shell, though the resin was imparted with elasticity by cross-linked molecules.

Then the inventors improved the heat resistance of the microcapsules with the following design. Cross-linking and hardening the polymer of the outer shell after the expansion of microcapsules can improve the heat-resistance of microcapsules. And high-density three-dimensional cross-linkage makes shell resistant enough against shrinkage even when the shell is very thin and improves the heat-resistance of microcapsules drastically.

The monomers having functional groups, which cross-link with carboxylic acids, are monomers containing methylol, epoxy, amino or hydroxyl, and any of those monomers harden polymer shell at high temperature and are effective for cross-linking.

With those steps, heat-resistant foaming microcapsules that foam at very high temperature and are applicable to various fields could be produced.

The present invention comprises the following.

(1) Heat-expandable microcapsules comprising the shell of the polymer produced by polymerizing the essential components, (I) acrylonitrile, a main component, (II) a monomer having carboxyl and (III) a monomer having groups reactive with the carboxyl of said monomer (II), and a liquid having a boiling point lower than the softening point of said polymer and being encapsulated in the shell.

(2) Heat-expandable microcapsules comprising the shell of the polymer produced by polymerizing the essential components, (I) acrylonitrile, a main component, (II) a monomer having carboxyl, (III) a monomer having groups reactive with the carboxyl of said monomer (II) and (IV) a monomer having two or more of double bonds, and a liquid having a boiling point lower than the softening point of said polymer and being encapsulated in the shell.

(3) Heat-expandable microcapsules comprising the shell of the polymer produced by polymerizing the essential components, (I) acrylonitrile, a main component, (II) a monomer having carboxyl, (III) amonomer having groups reactive with the carboxyl of said monomer (II) and (V) a monomer having high Tg for controlling softening point, and a liquid having a boiling point lower than the softening point of said polymer and being encapsulated in the shell.

(4) Heat-expandable microcapsules comprising the shell of the polymer produced by polymerizing the essential components, (I) acrylonitrile, a main component, (II) a monomer having carboxyl, (III) a monomer having groups reactive with the carboxyl of said monomer (II), (IV) a monomer having two or more of double bonds and (V) a monomer having high Tg for controlling softening point, and a liquid having a boiling point lower than the softening point of said polymer and being encapsulated in the shell.

(5) A process for producing heat-expandable microcapsules specified by the steps where an oil phase containing the above monomers (I), (II), (III), (IV) and (V) and a water phase are mixed and agitated and then the monomers in the oil phase are polymerized.

(6) A process for producing porous composite combined with inorganic powder specified by the steps where one of the heat-expandable microcapsules described in the above (1) to (4) is mixed with inorganic powder, heated and agitated for expanding the microcapsules and sticking the inorganic powder onto the surface of said microcapsules.

(7) Porous composite combined with inorganic powder produced by expanding one of the heat-expandable microcapsules described in the above (1) to (4) and by sticking inorganic powder onto said microcapsules.

(8) Resin composition containing the porous composite combined with inorganic powder described in the above (7).

(9) Paint containing the porous composite combined with inorganic powder described in the above (7).

BEST MODE OF EMBODIMENT

The desirable mode of embodiment is described in the following.

The radical-reactive monomers having unsaturated double bond to be used for the polymer shell of the present invention are as follows.

(Component I)

The monomers that have heat-resistance, crystallinity and superior function as vapor-barriers and react comparatively rapidly with various monomers to make copolymers are suitable for the main component. Only acrylonitrile satisfies such requirement. The preferable ratio of the monomer is 20–80 mol %, more preferably 30–70 mol %.

(Component II)

Acrylonitrile cannot retain its elasticity at high temperature due to its low Tg though it is heat-resistant. The component II supplements the shortage with its high crystallinity and high Tg, which increase the softening point of polymer shell The carboxylic acid monomers are proper for the purpose. The polymer produced from the monomers has close membrane structure owing to its strong hydrogen bonds and has higher heat-resistance.

The monomers having carboxylic acid in their molecular structure, such as acrylic acid, methacrylic acid, succinic acid, itaconic acid and their metal salts, are used for the purpose. The metal salts include magnesium acrylate, calcium acrylate, zinc acrylate, magnesium methacrylate, calcium methacrylate and zinc methacrylate, and are not restricted within the scope of those described here. The ratio of the metal salts is 5–40 mol %, preferably 10–30 mol % of the total of polymer shell.

(Component III)

The polymers of high Tg and crystallinity can sufficiently expand microcapsules at high temperature, and such function is satisfactory in ordinary use. But the microcapsules used at extremely high temperature are required to have improved heat-resistance achieved by three-dimensional structure of the foamed resin, which prevents the resin from softening. The resin that forms such microcapsules is highly reactive owing to the high quantity of carboxylic acid contained, and is especially reactive with epoxy and methylol. And the resin exhibits high heat resistance with the advancement of cross-linkage of polymer under continued high temperature and with acidic catalyst in molecules.

The monomers behaving as described above are those mentioned below, though they are not restricted within the scope of those described herein and any monomers having groups reactive with carboxylic acid in their molecules are applicable.

The examples of the monomers are N-methylol acrylamide, N-methylol methacrylamide, glycidyl acrylate, glycidyl methacrylate, 2-hydroxyethyl (meth) acrylate, 2-hydroxypropyl (meth) acrylate, 2-hydroxybutyl (meth) acrylate, 2-hydroxy-3-phenoxypropyl acrylate, N,N-dimethylaminoethyl (meth)acrylate, N,N-dimethylaminopropyl methacrylate, magnesium no monoacrylate and zinc monoacrylate. The preferable amount is 1–30 mol %, more preferably 2–20 mol %.

(Component V)

The monomers to be reacted into polymer having high Tg and functioning as a supplementary component of the main polymer are as follows. They are used as the binder monomers for acrylonitrile and carboxylic acid monomers to control their polymerization rate, to control the elongation of the elastic property and softening point of main monomer and to improve polymer film tenacity. Thus the monomers that form homopolymer having comparatively high Tg are used for the purpose. They are described below.

They are the monomers of which homopolymers have a Tg of 80 ° C. or more, such as methacrylonitrile, acrylamide, methacrylamide, N,N-dimethylacrylamide, N,N-dimethylmethacrylamide, methyl methacrylate, t-butyl methacrylate, isobornyl(meth)acrylate, cyclohexyl methacrylate, benzyl methacrylate, N-vinyl pyrrolidone and styrene. And such monomers are not restricted within the scope of those described herein. The preferable quantity is 0–50 mol %, more preferably 10–40 mol %.

(Component IV)

The cross-linking monomers having two or more polymerizable double bonds are selected among those described below. Those monomers cross-link the linear copolymer comprising the above-mentioned monomers to expand the range of the elasticity of the copolymer and to impart thermal stability. The examples of such monomers are as follows though they are not restricted within the scope of the examples.

They are ethylene glycol di(meth)acrylate, propylene glycol di(meth)acrylate, diethylene glycol di(meth)acrylate, 1,4-butanediol di(meth)acrylate, 1,6-hexane diol di(meth) acrylate, trimethylol propane tri(meth)acrylate, glycerin di(meth)acrylate, triethylene glycol di(meth)acrylate, PEG#200 di(meth)acrylate, PEG#400 di(meth)acrylate, PEG#600 di(meth)acrylate, 1,3-butane diol di(meth) acrylate, neopentyl glycol di(meth)acrylate, 1,10-decane diol di(meth)acrylate, penta erythritol tri(meth)acrylate, penta erythritol tetra(meth)acrylate, penta erythritol hexa (meth) acrylate, 3-acryloil oxyglycerine monoacrylate, dimethylol tricyclodecane di(meth)acrylate and triaryl formal tri(meth)acrylate. And the preferable quantity is 0–5 mol %, more preferably 0–3 mol %.

The microcapsules are actually produced with the conventional processes for expandable microcapsules in usual cases. In the process, colloidal silica gel is used as the dispersing agent of water phase. And water-soluble polymer compounds are used as sub-agent for dispersion.

Amphoteric or cationic water-soluble polymers, such as diethanolamine-adipic acid condensate, polyethylene imine or polyvinyl pyrrolidone polymer, are used for the purpose.

Inorganic metal salts are used for the present invention because great quantity of water-soluble monomer is used. The water-soluble compounds in neutral or acidic region, such as water-soluble metal salts including sodium chloride, magnesium chloride and sodium sulfate are used.

Their concentration in the aqueous mixture is from their saturation to 5% lower than their saturation in water. The aqueous mixture is prepared into the water phase by controlling its pH from 3 to 5.

The oil phase is used after being mixed homogeneously. The oil phase comprises the above-mentioned monomer mixture having unsaturated double bond reactive with radicals, a solvent mixture having a boiling point within practicable range and the mixture of radical polymerization initiators. Any organic solvent that has a boiling point below the practicable maximum limit and attains high expansion efficiency without dissolving into polymer shell can be used. Hydrocarbon solvents having a boiling point from 50 to 200° C. are suitable because they are used at high temperature. Solvents such as n-hexane, isohexane, n-heptane, n-octane, isooctane, n-decane, isodecane and petroleum fractions are used. A solvent having comparatively low boiling point lowers the starting temperature of expansion.

The mixture of two or more of radical polymerization initiators is used in the process. Combining two or more of catalysts which exhibit 20° C. or more difference in the temperature in 10-hr half-value period is preferable for remaining no acrylonitrile monomers. The applicable catalysts are peroxides or azobis compounds of which difference in the temperature in 10-hr half-value period ranges from 0 to 130° C., preferably 20 to 100° C. Specifically the applicable catalysts are diisopropyl peroxycarbonate, dioctyl peroxydicarbonate, t-butyl peroxylaurate, lauroyl peroxide, dioctanoyl peroxide, benzoyl peroxide, azobisisobutyronitrile, azobis (2,4-dimethyl valeronitrile), 1,1-azobis (cycrohexane-1-carbonytrile) and dimethyl 2,2'-azobis (2-methyl propionate). And combination of azobis isobutylonitrile and 1,1-azobis (cyclohexane-1-carbonytrile) or the combination of (2,4-dimethyl valeronitrile) and 1,1-azobis (cyclohexane-1-carbonytrile) is more preferable.

In addition to the use as a blowing agent to be kneaded into resins, the heat-expandable microcapsules, that foam at high temperature, of the present invention can be used as a low-specific-gravity inorganic powder porous composite that has been used conventionally. The inorganic powder porous composite can be produced by mixing the heat-expandable microcapsules expansive at high temperature of the present invention with powders such as titanium oxide, calcium carboxylate or talc and by heating with agitation to expand the capsule and to adhere the powder onto the surface of the microcapsules.

Such material is used for (1) lightening rubber, (2) lightening plastics such as polypropylene and (3) thick coats paint applied with high-pressure airless pumps. The fillers produced from conventional microcapsules cannot be applied to such fields or cannot satisfy the requirement of such field. The newly developed microcapsules described herein can achieve the sufficient performance required in those fields.

EXAMPLES

Example 1

A water phase was prepared by dissolving 55 g of sodium chloride in 160 g of ion-exchanged water, adding 1.0 g of adipic acid-diethanolamine condensate and 25 g of 20% aqueous solution of colloidal silica, controlling the pH of the mixture from 3.8 to 4.2 and homogenizing. An oil phase was prepared by mixing 45 g of acrylonitrile, 16 g of N, N-dimethyl acrylamide, 5 g of N-methylol acrylamide, 23 g of methacrylic acid, 0.1 g of ethylene glycol dimethacrylate, 0.3 g of azobisisobutyronitrile, 0.1 g of 1,1-azobis (cyclohexane-1-carbonytrile (V-40) and 15 g of isooctane and agitating to dissolve the mixture.

The water phase and oil phase were agitated in a homogenizer at 4000 rpm for 1 minute to makeup dispersion. The dispersion was transferred into a separable flask and the internal air was replaced by nitrogen. Then the dispersion was reacted with agitation being heated at 70° C. for 6 hours and then heated at 90° C. for 14 hours.

After the reaction, the dispersion was cooled and filtered to obtain wet powder containing 70% of solid. Then the wet powder was dried at room temperature and broken into the targeted microcapsules.

The particle diameter of the resultant microcapsules was from 10 to 30 μm and the ratio of the encapsulated isooctane was 11 wt %.

The microcapsules were observed to start heat-expansion at 220–230° C. and continued to expand up to 260° C. The expansion ratio was approx. 3 to 4 times of their original diameter. Then the microcapsules gradually shrank to approx. 2 times of their original diameter around 290° C.

The microcapsules were stored for three months at 50° C. and their expansion behavior was retested in the same manner. Their behavior was found to be the same as mentioned above.

Example 2

The microcapsules were produced in the same manner as in Example 1 except 12 g of 80% aqueous solution of acrylic acid was used instead of methacrylic acid.

The particle diameter of the resultant capsules was 10 to 30 μm and the ratio of the encapsulated isooctane was 10 wt %.

The microcapsules were observed to start heat-expansion at 210–230° C. and continued to expand up to 250° C. The expansion ratio was approx. 3 times of their original diameter. Then the microcapsules gradually shrank to approx. 2 times of their original diameter around 270° C.

The microcapsules were stored for three months at 50° C. and their expansion behavior was retested in the same manner. Their behavior was found to be the same as mentioned above.

Example 3

The microcapsules were produced in the same manner as in Example 1 except 0.2 g of polyethylene glycol #200 diacrylate was used instead of ethylene glycol dimethacrylate.

The particle diameter of the resultant capsules was 10 to 30 μm and the ratio of the encapsulated isooctane was 11 wt %.

The microcapsules were observed to start heat-expansion at 220–230° C. and continued to expand up to 260° C. The expansion ratio was approx. 2 to 3 times of their original diameter. Then the microcapsules gradually shrank to approx. 1.5 times of their original diameter around 300° C.

The microcapsules were stored for three months at 50° C. and their expansion behavior was retested in the same manner. Their behavior was found to be the same as mentioned above.

Example 4

The microcapsules were produced in the same manner as in Example 1 except 0.2 g of trimethylol propane trimethacrylate was used instead of ethylene glycol dimethacrylate.

The particle diameter of the resultant capsules was 10 to 30 μm and the ratio of the encapsulated isooctane was 10 wt %.

The microcapsules were observed to start heat-expansion at 220–230° C. and continued to expand up to 250° C. The expansion ratio was approx. 2 to 3 times of their original diameter. Then the microcapsules gradually shrank to approx. 1.5 times of their original diameter around 280° C.

The microcapsules were stored for three months at 50° C. and their expansion behavior was retested in the same manner. Their behavior was found to be the same as mentioned above.

Example 5

The microcapsules were produced in the same manner as in Example 1 except methacrylonitrile was used instead of N,N-dimethyl acrylamide, glycidyl methacrylate was used instead of N-methylol acrylamide, diisopropyl peroxydicarbonate was used instead of azobisisobutyronitrile and the reaction was performed at 45° C.

The particle diameter of the resultant capsules was 10 to 30 μm and the ratio of the encapsulated isooctane was 10 wt %.

The microcapsules were observed to start heat-expansion at 215–225° C. and continued to expand up to 250° C. The expansion ratio was approx. 3 times of their original diameter. Then the microcapsules gradually shrank to their original diameter around 270° C.

The microcapsules were stored for three months at 50° C. and their expansion behavior was retested in the same manner. Their behavior was found to be the same as mentioned above.

Example 6

The microcapsules were produced in the same manner as in Example 1 except isobornyl methacrylate was used instead of N,N-dimethyl acrylamide and 2-hydroxypropyle methacrylate was used instead of N-methylol acrylamide.

The particle diameter of the resultant capsules was 10 to 30 μm and the ratio of the encapsulated isooctane was 11 wt %.

The microcapsules were observed to start heat-expansion at 220–230° C. and continued to expand up to 260° C. The expansion ratio was approx. 2 times of their original diameter. Then the microcapsules gradually shrank to their original diameter around 270° C.

The microcapsules were stored for three months at 50° C. and their expansion behavior was retested in the same manner. Their behavior was found to be the same as mentioned above.

Example 7

The microcapsules were produced in the same manner as in Example 1 except Isoper E (a product of Exxon Chemicals, a high-boiling-point hydrocarbon having 110–130° C. boiling point) was used instead of isooctane.

The particle diameter of the resultant capsules was 10 to 30 μm and the ratio of the encapsulated Isoper E was 10 wt %.

The microcapsules were observed to start heat-expansion at 245–255° C. and continued to expand up to 265° C. The expansion ratio was approx. 2 to 3 times of their original diameter. Then the microcapsules gradually shrank to approx. 2 times of their original diameter around 285° C.

The microcapsules were stored for three months at 50° C. and their expansion behavior was retested in the same manner. Their behavior was found to be the same as mentioned above.

Example 8

The microcapsules were produced in the same manner as in Example 1 except the oil phase was prepared with 50 g of acrylonitrile, 18 g of N,N-dimethyl acrylamide, 6 g of N-methylol acrylamide, 12 g of methacrylic acid, 0.1 g of ethylene glycol dimethacrylate, 0.3 g of azobisisobutyronitrile, 0.1 g of V-40 and 15 g of isooctane.

The particle diameter of the resultant capsules was 10 to 30 μm and the ratio of the encapsulated isooctane was 11 wt %.

The microcapsules were observed to start heat-expansion at 220–230° C. and their expansion ratio was approx. 3 times of their original diameter. Then the microcapsules gradually shrank to two times of their original diameter around 270° C.

The microcapsules were stored for three months at 50° C. and their expansion behavior was retested in the same manner. Their behavior was found to be the same as mentioned above.

Example 9

The microcapsules were produced in the same manner as in Example 1 except the oil phase was prepared with 40 g of acrylonitrile, 14 g of N,N-dimethyl acrylamide, 5 g of N-methylol acrylamide, 34 g of methacrylic acid, 0.1 g of ethylene glycol dimethacrylate, 0.3 g of azobisisobutyronitrile, 0.1 g of V-40 and 15 g of isooctane.

The particle diameter of the resultant capsules was 10 to 30 μm and the ratio of the encapsulated isooctane was 11 wt %.

The microcapsules were observed to start heat-expansion at 220–230° C. and continued to expand up to 260° C. Their expansion ratio was approx. 3 to 4 times of their original diameter. Then the microcapsules gradually shrank to their original diameter around 290° C.

The microcapsules were stored for three months at 50° C. and their expansion behavior was retested in the same manner. Their behavior was found to be the same as mentioned above.

Example 10

The microcapsules were produced in the same manner as in Example 1 except isopentane was used instead of isooctane.

The particle diameter of the resultant capsules was 10 to 30 μm and the ratio of the encapsulated isopentane was 11 wt %.

The microcapsules were observed to start heat-expansion at 150–160° C. and continued to expand up to 240° C. The expansion ratio was approx. 3 times of their original diameter. Then the microcapsules gradually shrank to approx. 2 times of their original diameter around 260° C.

Comparative Example 1

The experiment was performed in the same manner as in Example 1 except sodium chloride was not used for water phase. But the resultant product did not form microcapsules but formed elastic mass.

Comparative Example 2

The microcapsules were produced in the same manner as in Example 1 except methacrylic acid was not used.

The particle diameter of the resultant capsules was 10 to 30 μm and the ratio of the encapsulated isooctane was 10 wt %.

The microcapsules were observed to start heat-expansion at 210–220° C. But they could not maintain their expansion and collapsed just after expansion.

Comparative Example 3

The microcapsules were produced in the same manner as in Example 1 except N-methylol acrylamide was not used.

The particle diameter of the resultant capsules was 10 to 30 μm and the ratio of the encapsulated isooctane was 10 wt %.

The microcapsules were observed to start heat-expansion at 210–220° C. But they could not maintain their expansion and collapsed just after expansion.

Comparative Example 4

The microcapsules were produced in the same manner as in Example 1 except 68 g of methacrylic acid was used instead of acrylonitrile.

The particle diameter of the resultant capsules was 100 μm or more. The microcapsules included coagulated substance and the ratio of the encapsulated isooctane was 5–7 wt %.

The microcapsules were observed to start heat-expansion at 220–230° C. and continued to expand up to 240° C. Their expansion ratio was approx. 1 to 2 times of their original diameter.

Example 11

The microcapsules were produced in the same manner as in Example 1 except the oil phase was prepared with 40 g of acrylonitrile, 14 g of N,N-dimethyl acrylamide, 5 g of N-methylol acrylamide, 34 g of methacrylic acid, 15 g of magnesium methacrylate, 0.1 g of ethylene glycol dimethacrylate, 0.3 g of azobisisobutyronitrile and 15 g of isooctane.

The particle diameter of the resultant capsules was 10 to 30 μm and the ratio of the encapsulated isooctane was 11 wt %.

The microcapsules were observed to start heat-expansion at 250–260° C. and continued to expand up to 300° C. Their expansion ratio was approx. 3 to 4 times of their original diameter. The microcapsules did not shrink at all after they were cooled down to room temperature.

The microcapsules were stored for three months at 50° C. and their expansion behavior was retested in the same manner. Their behavior was found to be the same as mentioned above.

Example 12

The microcapsules were produced in the same manner as in Example 1 except ethylene glycol dimethacrylate was no used.

The particle diameter of the resultant capsules was 10 to 30 μm and the ratio of the encapsulated isooctane was 11 wt %.

The microcapsules were observed to start heat-expansion at 220–230° C. and continued to expand up to 260° C. The expansion ratio was approx. 3 times of their original diameter. Then the microcapsules gradually shrank near to their original diameter around 280° C.

The microcapsules were stored for three months at 50° C. and their expansion behavior was retested in the same manner. Their behavior was found to be the same as mentioned above.

Example 13

The microcapsules were produced in the same manner as in Example 1 except N,N-dimethyl acrylamide was not used.

The particle diameter of the resultant capsules was 10 to 30 μm and the ratio of the encapsulated isooctane was 11 wt %.

The microcapsules were observed to start heat-expansion at 200–210° C. and continued to expand up to 240° C. The expansion ratio was approx. 3 times of their original diameter. Then the microcapsules gradually shrank near to their original diameter around 260° C.

The microcapsules were stored for three months at 50° C. and their expansion behavior was retested in the same manner. Their behavior was found to be the same as mentioned above.

Example 14
(Production process of low-specific-gravity inorganic powder porous composite)

Fifteen grams of microcapsules produced in Example 1 and 85 g of fine powder of titanium oxide were placed in a 2000-ml separable flask having four openings and agitated with stainless-steel agitating paddles at 250° C. for 10 minutes. The microcapsules expanded to the volume of 1200 ml, and titanium oxide adhered uniformly on the surface of the expanded microcapsules that softened simultaneously with the expansion. Thus low-specific-gravity inorganic powder porous composite was produced. The composite had an average diameter of 60 μm and specific gravity of 0.17. The inspection through SEM showed low-specific-gravity inorganic powder porous composite comprising expanded particles of which surface was coated with inorganic powder.

Example 15
(Lightening of rubber)

Two grams (2 wt %) of the low-specific-gravity inorganic powder porous composite produced in Example 14 was added to 100 g of the mixture of natural rubber and butyl rubber (natural rubber, a filler and additives) and the mixture was heated and pressed on heater rolls at 130° C. for 30 minutes. The heater rolls were rotated with 5 mm gap at 2-m/min peripheral speed.

The rubber was removed from the rolls and its cross section and surface were observed through SEM. The microcapsules were rarely deformed and collapsed. And the composite was found to be a good filler having both heat resistance and pressure resistance. The specific gravity of the rubber to which the filler was added was 0.8 being different from that of natural rubber without the filler, 1.23. The composite filler was proved to be effective enough for lightening rubber.

Example 16
(Lightening of polypropylene)

A hundred grams of polypropylene chip (5 mm in particle diameter, 165° C. melting point, 0.9 specific gravity) was melted with heating and gently agitated. Two grams of the inorganic powder porous composite produced in Example 14 was added and mixed homogeneously, and the volume of the mixture increased to 190 ml. The specific gravity of the mixture determined after cooling was 0.55. The cross section of the sheet processed from the mixture was observed through SEM and porous particles having average diameter of 60 μm were found to have dispersed uniformly in the resin. And it was assured that the porous particles were not collapsed by the heat of fusion of polypropylene or the shear stress of mixing.

Example 17
(Application to thick coats paint)

Thick coats paint was prepared by homogeneously mixing 40 g of polyvinyl chloride paste, 60 g of diisononyl phthalate, a plasticizer, and 5 g of the porous composite produced in Example 14. The specific gravity of the light polyvinyl chloride paste paint prepared with the porous composite was 0.9 while the specific gravity of a paint containing no such composite was 1.4.

The paint was pressed in an Airless Pump 70 with a pressure of 150 kg/cm2 and extruded from a chip No. 150 to form coating. The extruded coating was gathered and its specific gravity was measured to be 0.92. And almost all of the porous particles were not collapsed by the extrusion pressure. On the contrary, the specific gravity of the coating of a paint composition prepared with the same components except a porous composite available in market (a product of Matsumoto Yushi-Seiyaku Co., Ltd., Matsumoto Microsphere MFL 100CA) was blended instead of the porous composite reached 1.02 after extrusion and approx. 20% of the porous composite was observed to have been collapsed through SEM.

The light inorganic porous composite produced in Example 14 can be applied to various fields owing to its durability against the painting process of thick coats paint and its contribution to lightened coating.

Applicability in Industry

The heat-expandable microcapsules produced in the present invention can be applied constantly in a wide range owing to their controllable starting temperature of expansion, for example, controlling the temperature at approx. 130° C., the starting temperature of expansion of conventionally-used high-temperature expansive capsules, or owing to the minimized thermal deformation or collapse of expanded capsules even at 200° C. Both of those advantages can be controlled by exchanging an encapsulated solvent. And they can be expanded at high temperature, 240° C. or more that was impossible in conventional technology, by encapsulating a solvent of higher boiling point and thus they can replace organic blowing agents.

The high starting temperature of expansion of the microcapsules enables them to be used as the blowing agent for crystalline polypropylene, polyethylene and polyester to produce foam.

In addition, the microcapsules of the present invention can be applied to produce a composite comprising the microcapsule and inorganic powder being stack on the surface of the microcapsules. The composite is processed into an inorganic powder porous composite filler of controlled specific gravity and the filler can be applied in a wide range owing to the high heat resistance of the microcapsules of the present invention.

For example, they can be added to natural rubber in which they are exposed to high temperature and high sheering stress. And they retain their shape after expansion in rubber being different from conventional ones that collapse at their cross-liking temperature, and thus contribute to lightening tires. Tires of high tenacity and lightweight are one of the factors for lightweight automobiles.

What is claimed is:

1. A heat-expandable microcapsule comprising a polymer shell produced by polymerizing essential components, (I) acrylonitrile, a main monomer component, (II) a monomer having carboxyl and (III) a monomer reactive with the carboxyl of said monomer (II), and in which a solvent having a boiling point lower than the softening point of the polymer is encapsulated.

2. A heat-expandable microcapsule comprising a polymer shell produced by polymerizing essential components, (I) acrylonitrile, a main monomer component, (II) a monomer having carboxyl, (III) a monomer reactive with the carboxyl of said monomer (II) and (IV) a monomer having two or more of polymerizing double bonds, and in which a solvent having a boiling point lower than the softening point of the polymer is encapsulated.

3. A heat-expandable microcapsule comprising a polymer shell produced by polymerizing essential components, (I) acrylonitrile, a main monomer component, (II) a monomer having carboxyl, (III) a monomer reactive with the carboxyl of said monomer (II) and (V) a monomer having high Tg functioning as a component for controlling softening point, and in which a solvent having a boiling point lower than the softening point of the polymer is encapsulated.

4. A heat-expandable microcapsule comprising a polymer shell produced by polymerizing essential components, (I) acrylonitrile, a main monomer component, (II) a monomer having carboxyl, (III) a monomer reactive with the carboxyl of said monomer (II), (IV) a monomer having two or more of polymerizing double bonds and (V) a monomer having high Tg functioning as a component for controlling softening point, and in which a solvent having a boiling point lower than the softening point of the polymer is encapsulated.

5. A heat-expandable microcapsule of claim 1 to wherein said monomer (II) is selected among acrylic acid, methacrylic acid, succinic acid, itaconic acid and their metal salts, and its ratio is 5 to 40 mol % of whole monomers.

6. A heat-expandable microcapsule of claim 1, wherein said monomer (III) has two or more functional groups in a molecule and one of the functional groups has a radical polymerizing double bond.

7. A heat-expandable microcapsule of claim 3 wherein said monomer (V) is a polymerizing monomer to form homopolymer having Tg of 100° C. or more or the mixture of said monomers.

8. A heat-expandable microcapsule of claim 1 wherein radical polymerization initiators exhibiting 20° C. or more difference in temperature during 10-hr half-value period are used in combination for its production.

9. A production process of a heat-expandable microcapsule wherein an oil phase containing the above (I), (II), (III), (IV) and (V) is mixed and agitated in a water phase to be dispersed in the water phase and then polymerized.

10. A production process of an inorganic powder porous composite wherein the heat-expandable microcapsule of one of claim 1 is mixed with inorganic powder and expanded through heating and agitating to adhere the inorganic powder on the surface of said microcapsule.

11. An inorganic powder porous composite produced by adhering inorganic powder on the surface of expanded microcapsule of the heat-expandable microcapsule of one-of claim 1.

12. A resin composition containing the inorganic powder porous composite of claim 11.

13. A Paint containing the inorganic powder porous composite of claim 11.

14. A heat expandable microcapsule of claim 6, wherein the other functional groups of said two or more functional groups are selected from the group consisting of as hydroxyl, methylol, epoxy, amino, oxime, hydroxime, thiol and hydoxysilyl.

* * * * *